(12) United States Patent
Bagnasco et al.

(10) Patent No.: US 12,169,155 B2
(45) Date of Patent: Dec. 17, 2024

(54) SYSTEM AND METHOD FOR DIAGNOSING AN EXHAUST GAS SENSOR

(71) Applicant: Ford Global Technologies, LLC, Dearborn, MI (US)

(72) Inventors: Andrew Bagnasco, Plymouth, MI (US); Jose Francisco Martinez Leyva, Mexico City (MX); Tyler DeWine, Ann Arbor, MI (US); Hassene Jammoussi, Canton, MI (US); Adam Krach, Canton, MI (US); Gladys Galicia, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/168,301

(22) Filed: Feb. 13, 2023

(65) Prior Publication Data

US 2024/0272038 A1 Aug. 15, 2024

(51) Int. Cl.
| | | |
|---|---|---|
| *G01M 15/10* | (2006.01) | |
| *F02D 21/04* | (2006.01) | |
| *F02D 21/08* | (2006.01) | |
| *F02D 35/00* | (2006.01) | |
| *F02D 41/14* | (2006.01) | |

(52) U.S. Cl.
CPC .......... *G01M 15/104* (2013.01); *F02D 21/04* (2013.01); *F02D 21/08* (2013.01); *F02D 35/0046* (2013.01); *F02D 41/1454* (2013.01); *F02D 41/1476* (2013.01); *F02D 41/1495* (2013.01); *F02D 2021/083* (2013.01); *F02D 2700/0287* (2013.01)

(58) Field of Classification Search
CPC ...... G01M 15/104; F02D 21/04; F02D 21/08; F02D 35/0046; F02D 41/1454; F02D 41/1476; F02D 41/1495; F02D 2021/083; F02D 2700/0287
See application file for complete search history.

(56) References Cited

U.S. PATENT DOCUMENTS

| | | |
|---|---|---|
| 6,739,177 B2 | 5/2004 | Sato et al. |
| 7,574,905 B2 | 8/2009 | Toya |
| 8,145,409 B2 | 3/2012 | Kerns et al. |
| 8,290,688 B2 | 10/2012 | Watson |
| 9,382,865 B2 | 7/2016 | Genslak et al. |
| 9,500,151 B2 | 11/2016 | Jammoussi et al. |
| 9,541,469 B2 | 1/2017 | Uhrich et al. |

(Continued)

FOREIGN PATENT DOCUMENTS

| | | | | |
|---|---|---|---|---|
| WO | WO-02068807 A1 | * | 9/2002 | ............. F01N 11/00 |
| WO | WO-2011030451 A1 | * | 3/2011 | ......... F02D 41/1495 |
| WO | WO-2011048073 A1 | * | 4/2011 | ......... F02D 41/1456 |

OTHER PUBLICATIONS

Leyva, J. et al., "System and Method for Diagnosing an Exhaust Gas Sensor," U.S. Appl. No. 17/809,233, filed Jun. 27, 2022, 46 pages.

*Primary Examiner* — Joseph J Dallo
(74) *Attorney, Agent, or Firm* — Vincent Mastrogiacomo; McCoy Russell LLP

(57) ABSTRACT

A method and system for monitoring an exhaust gas sensor coupled in an engine exhaust is provided. In one example, the method determines an estimate of an exhaust gas oxygen sensor time constant according to a comparison of air/fuel ratios and a system time constant.

19 Claims, 9 Drawing Sheets

(56) References Cited

U.S. PATENT DOCUMENTS

| | | |
|---|---|---|
| 2005/0016253 A1 | 1/2005 | Anilovich et al. |
| 2013/0180509 A1 | 7/2013 | Makki et al. |
| 2014/0238368 A1* | 8/2014 | Jammoussi ......... F02D 41/2454 |
| | | 123/672 |
| 2014/0345584 A1* | 11/2014 | Jammoussi ............. F02D 41/30 |
| | | 123/672 |
| 2015/0046063 A1* | 2/2015 | Jammoussi ......... F02D 41/1495 |
| | | 701/102 |
| 2015/0047415 A1* | 2/2015 | Michalske .......... G01M 15/102 |
| | | 73/23.31 |
| 2015/0219033 A1 | 8/2015 | Jammoussi et al. |
| 2019/0136780 A1 | 5/2019 | Jammoussi et al. |
| 2020/0004909 A1 | 1/2020 | Emond et al. |
| 2020/0049091 A1 | 2/2020 | Dai et al. |

* cited by examiner

SYSTEM AND METHOD FOR DIAGNOSING AN EXHAUST GAS SENSOR

FIELD

The present disclosure relates to monitoring an exhaust gas sensor in a motor vehicle.

BACKGROUND AND SUMMARY

A vehicle may include an exhaust gas sensor to provide feedback for controlling an engine's air-fuel ratio. The exhaust gas sensor may be positioned in an exhaust system of a vehicle to detect an air-fuel ratio of exhaust gas exhausted from an internal combustion engine of the vehicle. The exhaust gas sensor readings may be applied to provide closed-loop control of the engine's air-fuel ratio. The closed-loop air-fuel control operates to remove steady-state air-fuel errors and to correct transient air-fuel errors that may result from system changes and/or mapping errors.

Degradation of an exhaust gas sensor may cause engine control degradation that may result in increased emissions and/or reduced vehicle drivability. Therefore, it may be desirable to provide accurate determination of exhaust gas sensor degradation. In addition, regulatory requirements in certain regions of the world require six different types of $O_2$ sensor degradation monitoring. The degradation behavior types may be categorized as asymmetric type degradation (e.g., rich-to-lean asymmetric delay, lean-to-rich asymmetric delay, rich-to-lean asymmetric slow response, lean-to-rich asymmetric slow response) that affects only lean-to-rich or rich-to-lean exhaust gas sensor response rates, or symmetric type degradation (e.g., symmetric delay, symmetric slow response) that affects both lean-to-rich and rich-to-lean exhaust gas sensor response rates. The delay type degradation behaviors may be associated with the initial reaction of the exhaust gas sensor to a change in exhaust gas composition and the slow response type degradation behaviors may be associated with a time duration after an initial exhaust gas sensor response to transition from a rich-to-lean or lean-to-rich exhaust gas sensor output.

Previous approaches for monitoring asymmetric and symmetric slow sensor responses may have interfered with engine operation and generated results that were inconsistent. As a result, the approaches may have increased engine emissions and/or generated results that may not have been as accurate as may be desired.

The inventors herein have recognized the above issues and have overcome at least some of the issues via a method of monitoring an exhaust gas sensor in an engine exhaust passage, including generating an indication of exhaust gas sensor degradation via a controller according to a system time constant of the exhaust gas sensor exceeding a threshold, the system time constant estimated based on a current air/fuel ratio (AFR), a previous AFR, a starting AFR, and an expected final AFR.

By indicating exhaust sensor degradation according to a system time constant estimate that is based on changes to the AFR, it may be possible to provide the technical result of improving an estimate of a slow response time of an exhaust gas sensor. In particular, the inventors herein have determined that there is a high correlation between a rate of change of output of an exhaust gas sensor and a system time constant (e.g., an amount of time it takes for output of the oxygen sensor to reach a predetermined percentage of a final value output by the oxygen sensor responding to a step change in exhaust gas constituents supplied to the oxygen sensor) of the exhaust gas sensor.

The present method and system may provide the advantage of improving an oxygen sensor response time estimate. By improving the oxygen sensor response time estimate, it may be possible to improve engine air-fuel ratio control. In addition, the system and method described herein may simplify methods for estimating an oxygen sensor response time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
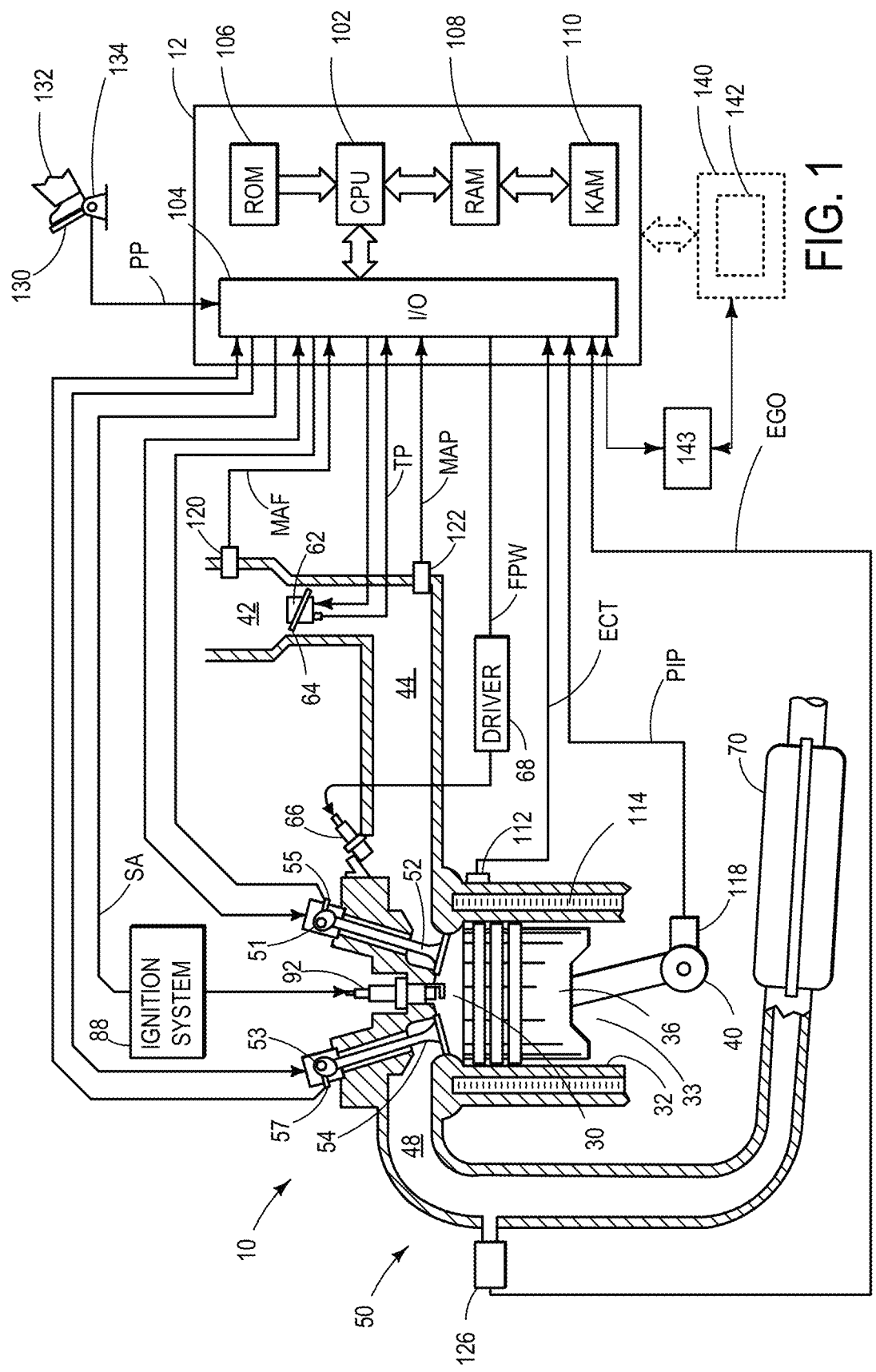
FIG. 1 shows a schematic diagram of an embodiment of a propulsion system of a vehicle including an exhaust gas sensor.
Figure 8:
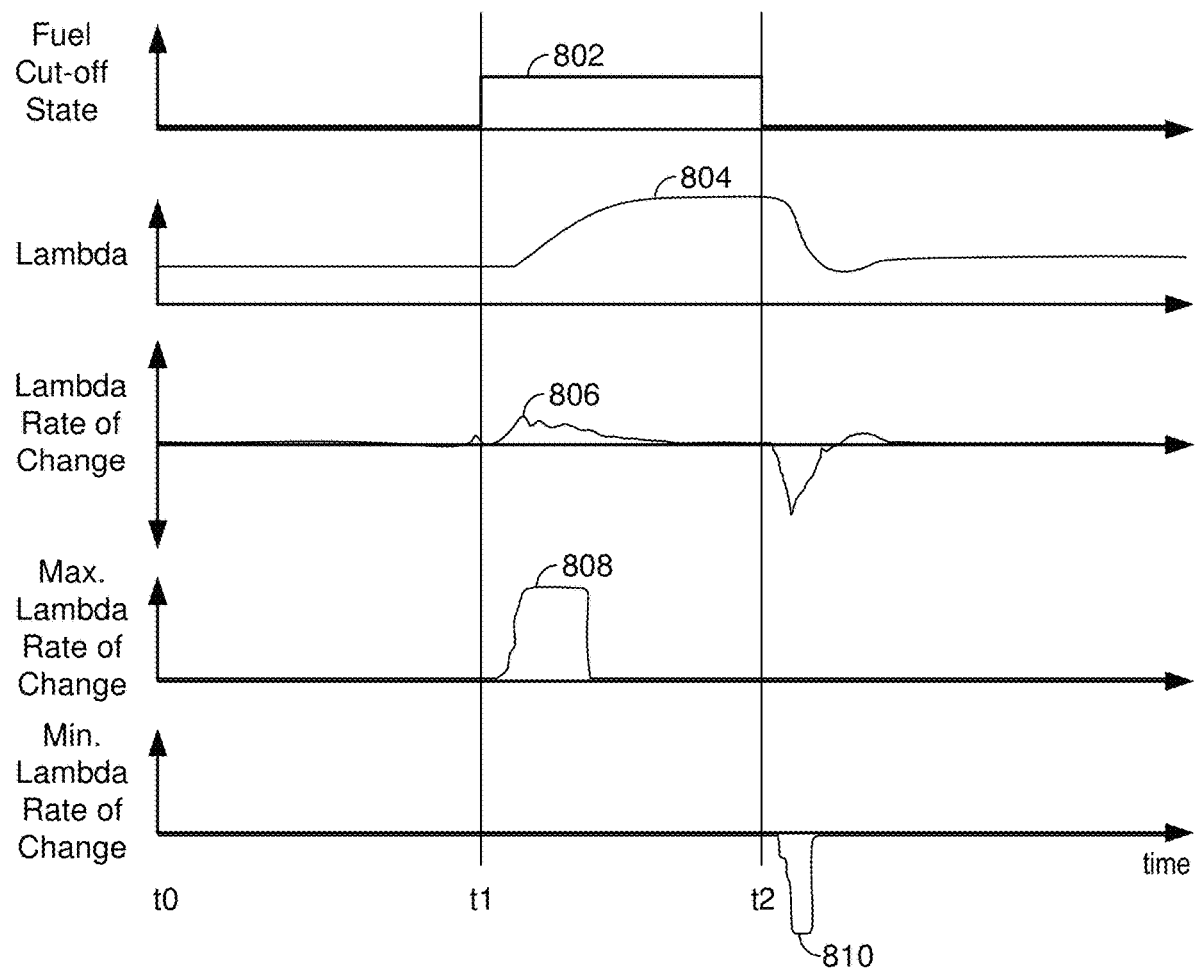
FIG. 8 includes plots that illustrate Lambda values generated from output of an oxygen sensor responding to an engine entering and exiting a fuel cut-off mode.
Figure 9:
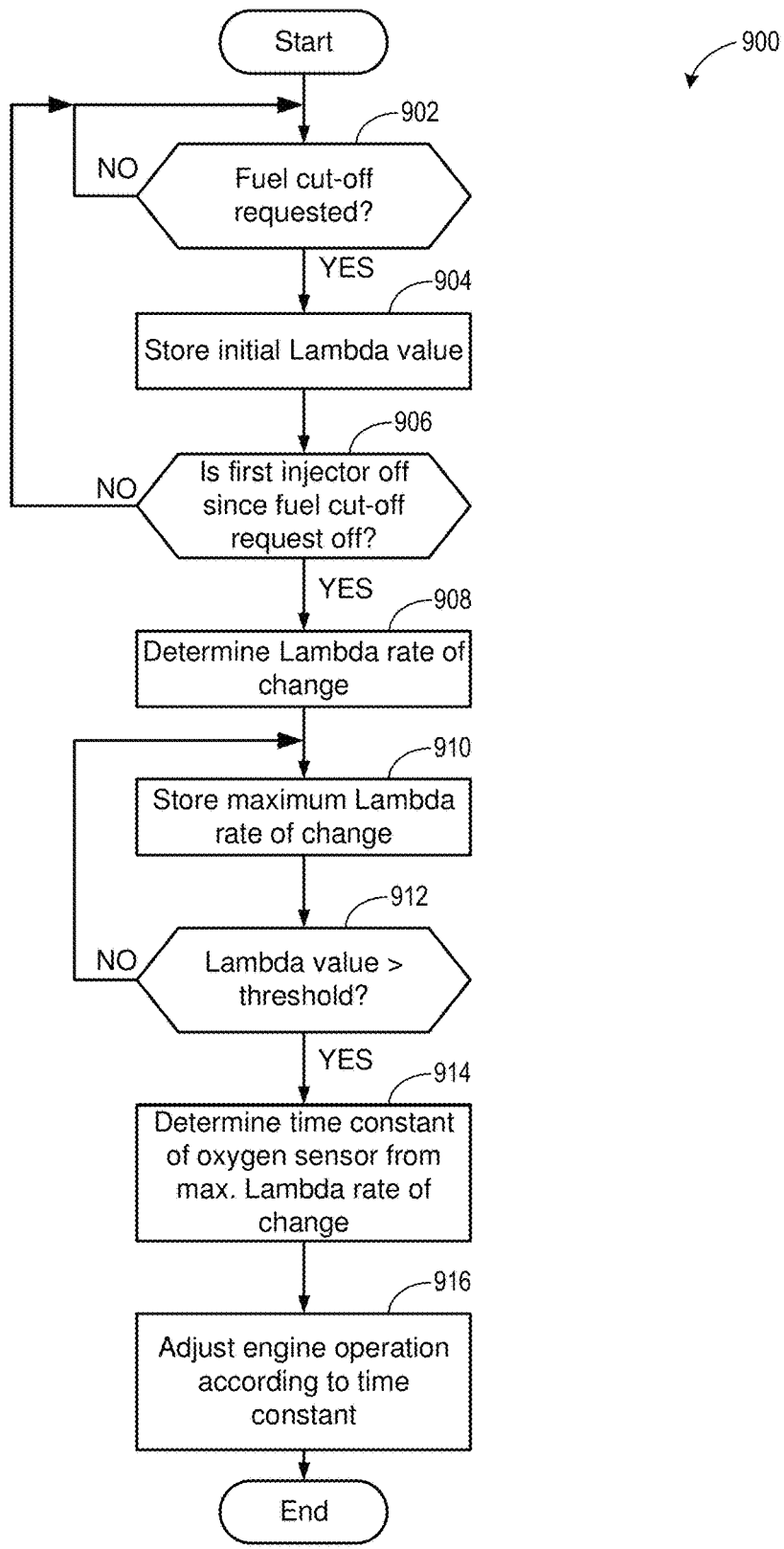
FIGS. 9 and 10 flowcharts of methods for estimating time delays of an exhaust gas sensor.
Figure 10:
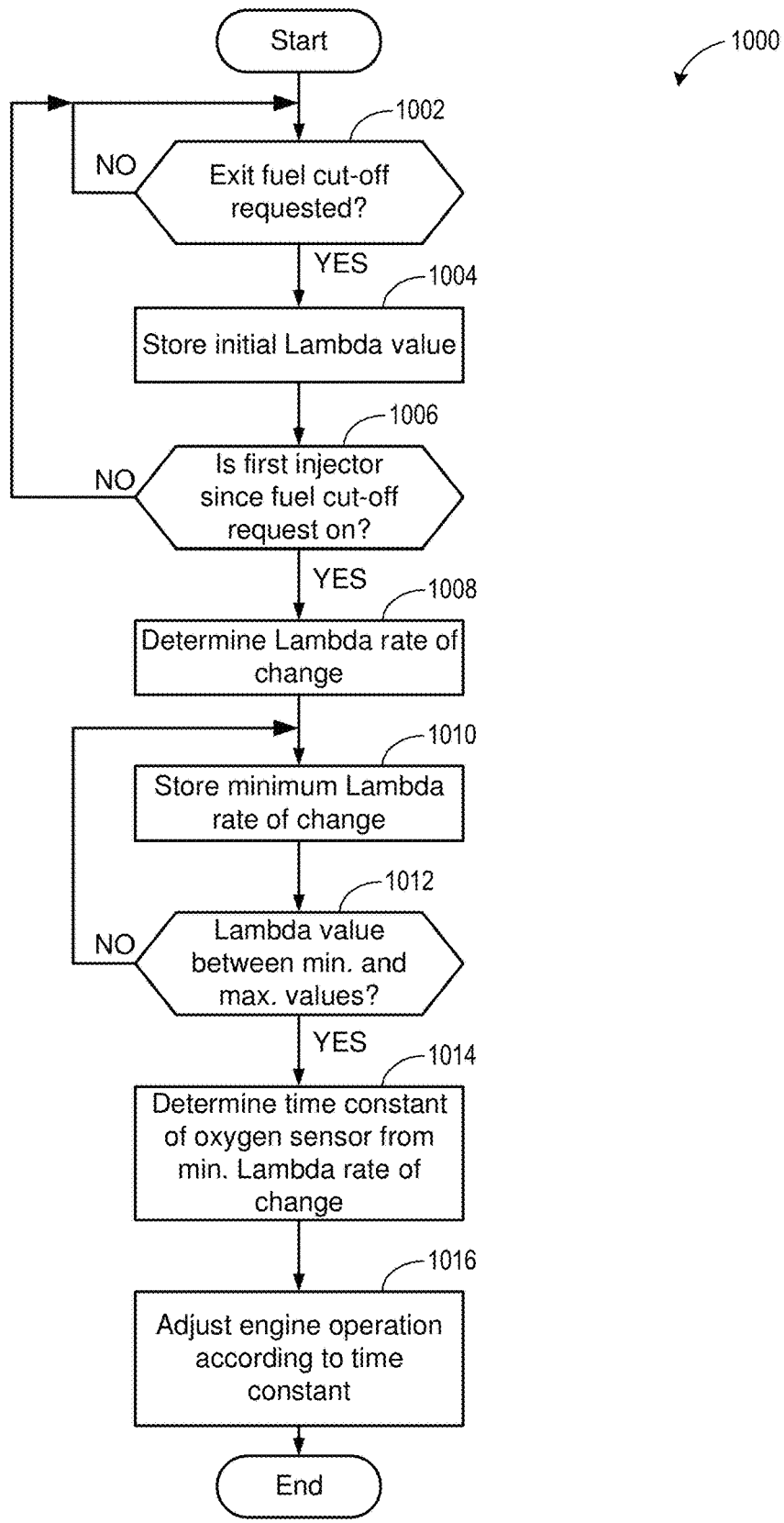
Figure 11:
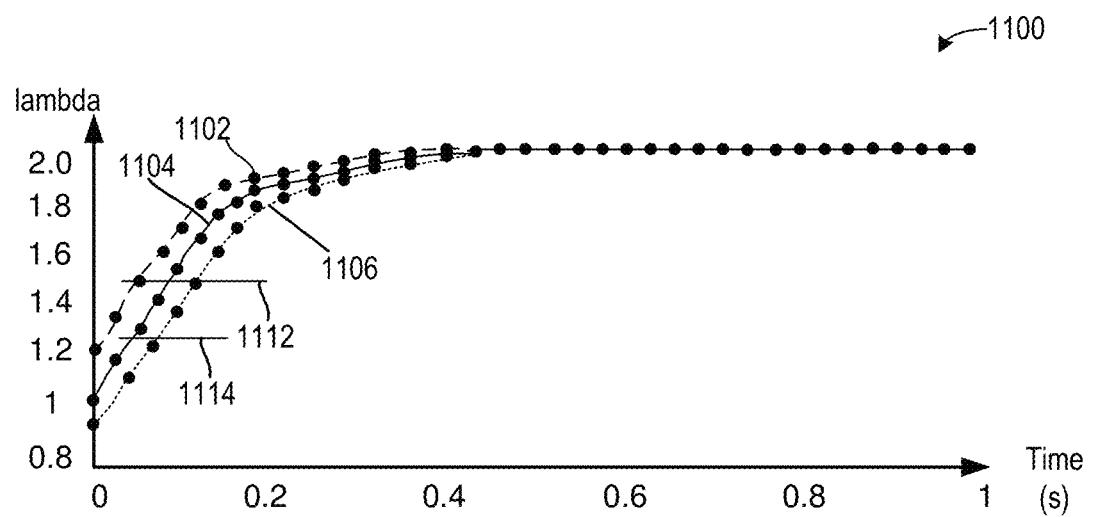
FIG. 11 shows a plot of an example correlation between a rate of change of output of an oxygen sensor and a system time constant.
Figure 12:
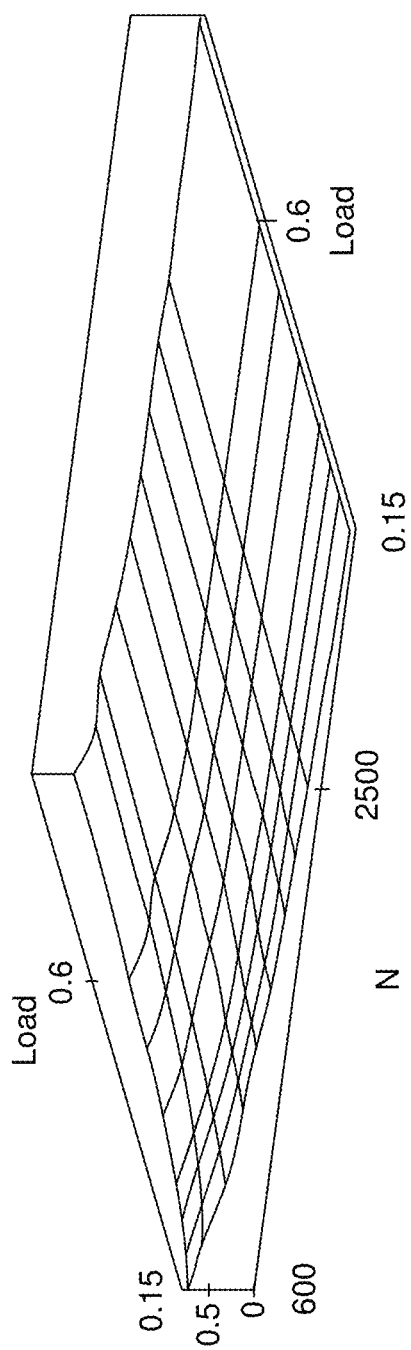
FIG. 12 shows a plot of nominal time constant versus engine speed and load.
Figure 13:
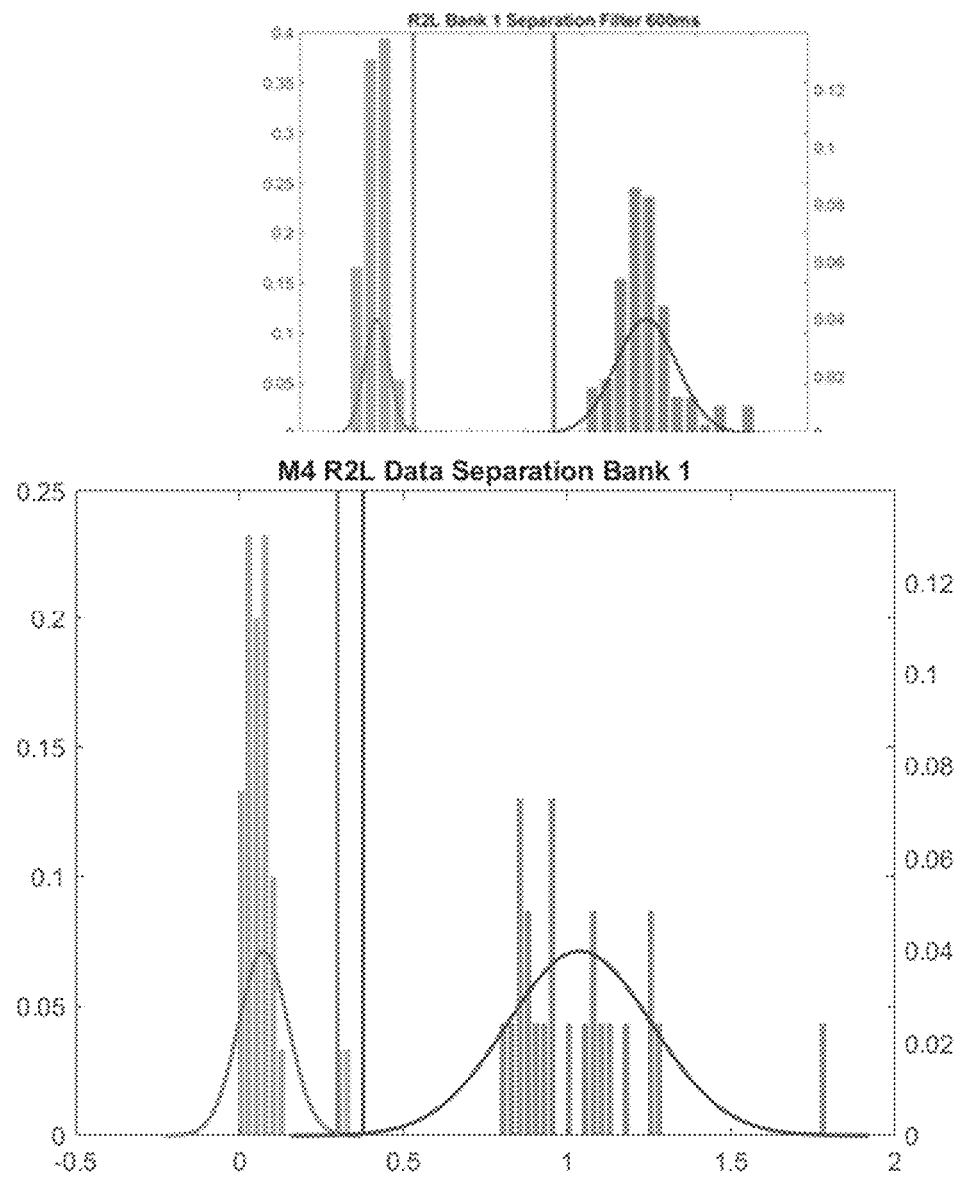
FIG. 13 shows a histogram that illustrates time constant distributions between nominal and degraded oxygen sensors.
Figure 13:
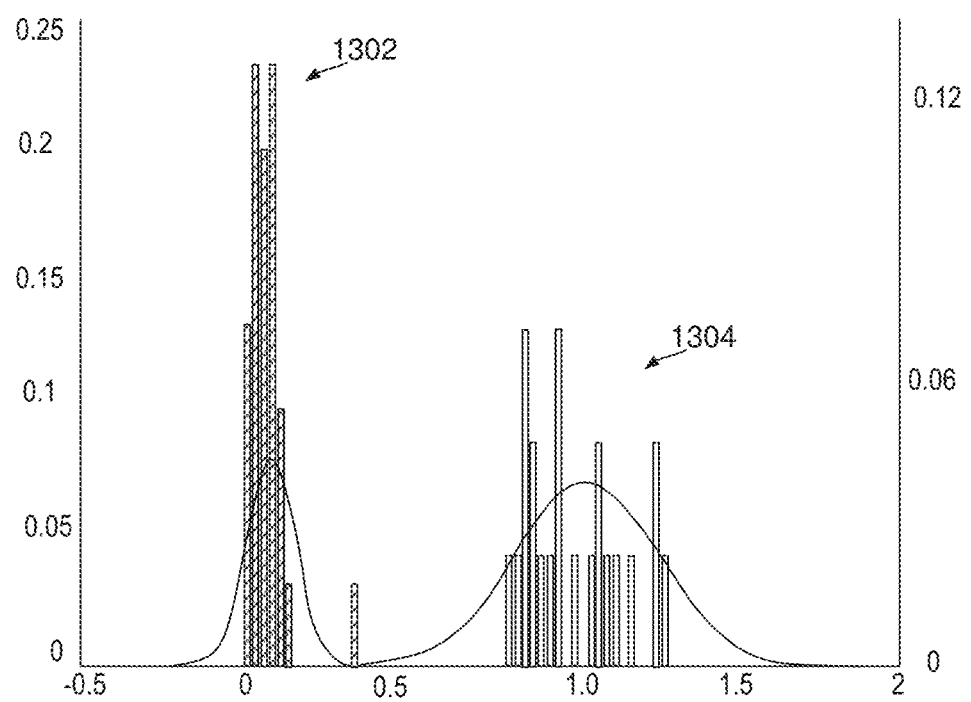

The following description relates to an approach for determining degradation of an exhaust gas sensor. The approach may be applied to an engine of the type that is shown in FIG. 1. Oxygen sensor signal attributes and characteristics are shown in FIGS. 2-7. A sequence illustrating rates of change in output of an oxygen sensor responding to an engine entering and exiting a fuel cut-off mode is shown in FIG. 8. Flow charts of methods for estimating time constants of an oxygen sensor are shown in FIGS. 9 and 10. Relationships between a rate of change of oxygen sensor output and a system time constant are shown in FIG. 11. A plot of a nominal time constant for a system and engine speed and load is shown in FIG. 12. FIG. 13 shows a histogram of time constants for degraded and non-degraded oxygen sensors.

FIG. 1 is a schematic diagram showing one cylinder 33 of multi-cylinder engine 10, which may be included in a propulsion system of a vehicle in which an exhaust gas sensor 126 may be utilized to determine an air-fuel ratio of exhaust gas produce by engine 10. The air-fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 33 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emissions control device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from position sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, position sensor 118, which is also used as an engine speed sensor, may produce a predetermined number of equally spaced pulses every revolution of the crankshaft.

Furthermore, at least some of the above described signals may be used in the exhaust gas sensor degradation determination method described in further detail below. For example, the inverse of the engine speed may be used to determine delays associated with the injection—intake—compression—expansion—exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air-fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12. Controller 12 and/or controller 140 may send and receive messages to human/machine interface 143 (e.g., a touch screen display, light, display panel, etc.).

In one example, the air-fuel ratio of engine 10 may be controlled via an air-fuel controller including an anticipatory controller and a feedback control routine, such as a proportional/integral (PI) controller. The anticipatory controller may be used for compensating the sensor degradation. The anticipatory controller may include a Smith Predictor. The Smith Predictor may include a time constant, $T_{C\text{-}SP}$, and time delay, $T_{D\text{-}SP}$. The PI controller may include a proportional gain, $K_P$, and an integral gain, $K_I$. In response to degradation of an exhaust gas sensor, the controller parameters listed above may be adjusted to compensate for the degradation and increase the accuracy of air-fuel ratio readings, thereby increasing engine control and performance. The PI controller and the anticipatory controller may adjust fuel injection timing. Note storage medium read-only memory 106 and/or processing resources 142 can be programmed with computer readable data representing instructions executable by processor 102 and/or dedicated controller 140 for performing the methods described below as well as other variants.

Thus, the system of FIG. 1 provides for a system for a vehicle, comprising: an engine including a fuel injection system; an exhaust gas sensor coupled in an exhaust system of the engine; and a controller including instructions executable to: estimate an oxygen sensor time constant from a theoretical system time constant and a correlation between a rate of change of a signal and a system time constant; and additional instructions to indicate a presence or absence of degradation of the exhaust gas sensor in response to the oxygen sensor time constant. In a first example, the system includes wherein the theoretical system time constant is approximated via a half rule approximation. In a second example that may include the first example, the system includes wherein the oxygen sensor time constant is estimated via a reverse half rule approximation. In a third example that may include one or more of the first and second examples, the system includes wherein the signal is a Lambda signal. In a fourth example that may include one or more of the first through third examples, the system further comprises additional instructions to adjust engine fuel delivery based on the oxygen sensor time constant. In a fifth example that may include one or more of the first through fourth examples, the system further comprises additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is leaner than the second air-fuel ratio mixture. In a sixth example that may include one or more of the first through fifth examples, the system further comprises additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is richer than the second air-fuel ratio mixture. In a seventh example that may include one or more of the first through sixth examples, the system includes wherein the presence or absence is indicated via a human/machine interface.

As discussed above, exhaust gas sensor degradation may be determined based on any one, or in some examples each, of six discrete behaviors indicated by delays in the response rate of air/fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

Figure 2:
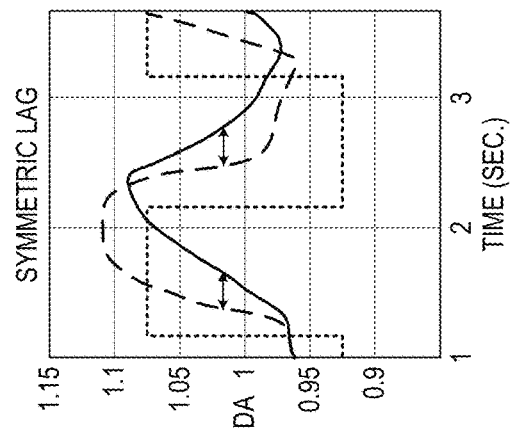
FIG. 2 shows a graph indicating a symmetric lag or slow response type degradation behavior of an exhaust gas sensor.

FIG. 2 shows a graph indicating a first type of degradation behavior that may be exhibited by a degraded exhaust gas sensor. This first type of degradation behavior is a symmetric slow response type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

Figure 3:
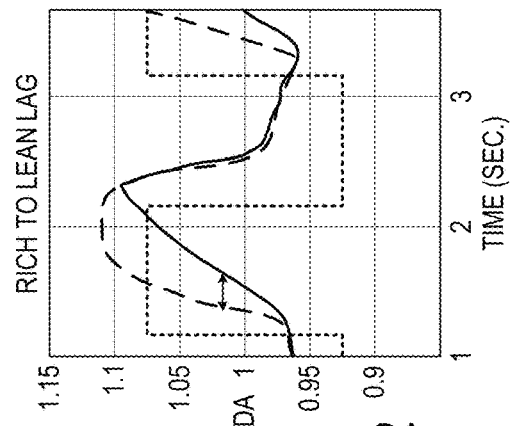
FIG. 3 shows a graph indicating an asymmetric rich-to-lean lag or slow response type degradation behavior of an exhaust gas sensor.

FIG. 3 shows a graph indicating a second type of degradation behavior that may be exhibited by a degraded exhaust gas sensor. The second type of degradation behavior is an asymmetric rich-to-lean slow response type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

Figure 4:
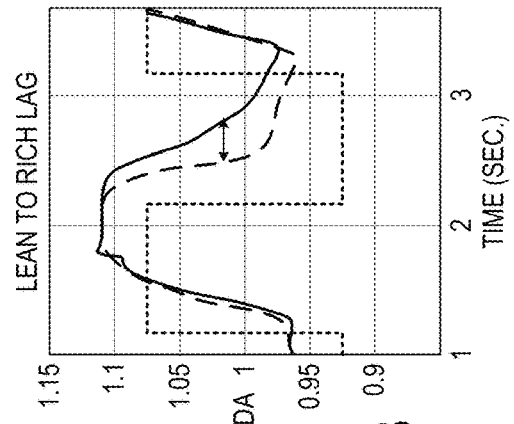
FIG. 4 shows a graph indicating an asymmetric lean-to-rich lag or slow response type degradation behavior of an exhaust gas sensor.

FIG. 4 shows a graph indicating a third type of degradation behavior that may be exhibited by a degraded exhaust gas sensor. The third type of behavior is an asymmetric lean-to-rich slow response type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

Figure 5:
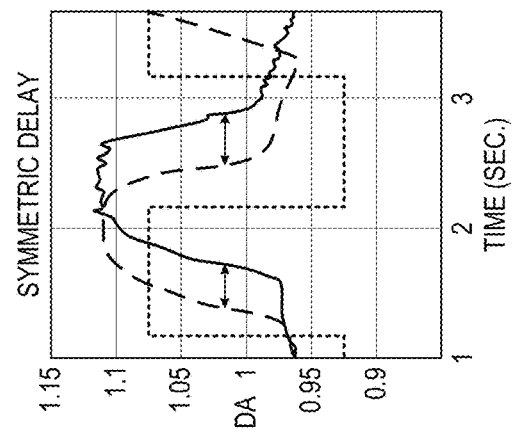
FIG. 5 show a graph indicating a symmetric delay type degradation behavior of an exhaust gas sensor.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

Figure 6:
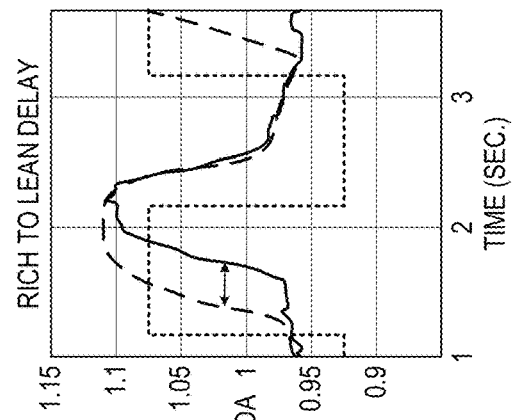
FIG. 6 shows a graph indicating an asymmetric rich-to-lean delay type degradation behavior of an exhaust gas sensor.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

Figure 7:
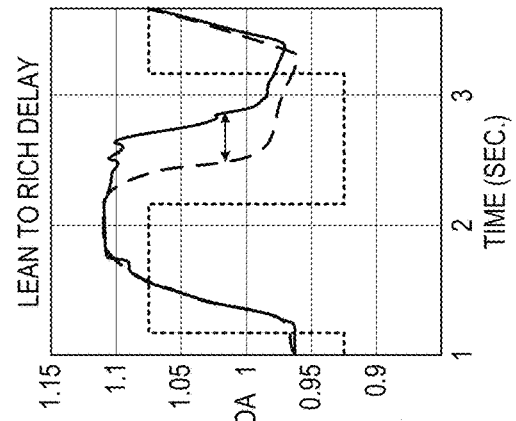
FIG. 7 shows a graph indicating an asymmetric lean-to-rich delay type degradation behavior of an exhaust gas senor.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

Referring now to FIG. 8, signals of interest during a sequence where an engine is transitioned into and out of a fuel cut-off mode (e.g., where an engine rotates without fuel being injected or delivered to the engine) is shown. The sequence shown in FIG. 8 may be provided via the system of FIG. 1 in cooperation with the methods of FIGS. 9 and 10. The vertical lines at times t0-t2 represents times of interest during the sequence.

The first plot from the top of FIG. 8 is a plot of a fuel cut-off request state versus time. The vertical axis represents the fuel cut-off request state and the fuel cut-off request is asserted when trace 802 is at a higher level that is near the vertical axis arrow. The fuel cur-off request is not asserted when trace 802 is at a lower level near the horizontal axis. The horizontal axis represents time and time increases from the left side of the plot to the right side of the plot. Trace 802 represents a fuel cut-off request state.

The second plot from the top of FIG. 8 is a plot of a Lambda value as determined from output of an oxygen sensor versus time. The vertical axis represents Lambda and the Lambda value increases (e.g., indicates a leaner air-fuel ratio) in the direction of the vertical axis arrow. The horizontal axis represents time and time increases from the left side of the plot to the right side of the plot. Trace 804 represents a Lambda value sensed via an oxygen sensor in the engine's exhaust system.

The third plot from the top of FIG. 8 is a plot of a Lambda rate of change value as determined from output of an oxygen sensor versus time. The vertical axis represents the Lambda rate of change value and the Lambda rate of change value increases in the direction of the vertical axis arrow. The horizontal axis represents time and time increases from the left side of the plot to the right side of the plot. Trace 806 represents a Lambda rate of change value determined from output of an oxygen sensor in the engine's exhaust system.

The fourth plot from the top of FIG. 8 is a plot of a maximum Lambda rate of change value as determined from output of an oxygen sensor versus time. The vertical axis represents the maximum Lambda rate of change value and the maximum Lambda rate of change value increases in the direction of the up pointing vertical axis arrow. The horizontal axis represents time and time increases from the left side of the plot to the right side of the plot. Trace 808 represents a maximum Lambda rate of change value determined from output of an oxygen sensor in the engine's exhaust system.

The fifth plot from the top of FIG. 8 is a plot of a minimum Lambda rate of change value as determined from output of an oxygen sensor versus time. The vertical axis represents the minimum Lambda rate of change value and the minimum Lambda rate of change magnitude increases in the direction of the down pointing vertical axis arrow. The horizontal axis represents time and time increases from the left side of the plot to the right side of the plot. Trace 810 represents a minimum Lambda rate of change value determined from output of an oxygen sensor in the engine's exhaust system.

At time t0, the engine is running and combusting air and fuel. The Lambda value is not changing and the fuel cut-off request has not been asserted. The Lambda rate of change value is zero and the minimum and maximum Lambda rates or change are zero.

At time t1, fuel cut-out mode is requested as indicated by the fuel cut-off state level changing to a higher level. Fuel cut-out mode may be requested when driver demand is low and vehicle speed is greater than a threshold speed. The Lambda value starts increasing shortly after time t1 as air begins to be pumped through deactivated cylinders. The maximum Lambda rate of change is zero until the Lambda level begins to change. Likewise, the minimum Lambda rate of change is zero.

Between time t1 and time t2, the engine remains in fuel cut-off mode and the Lambda value indicates leaner values. The Lambda rate of change is positive and the maximum Lambda rate of change peaks. The minimum Lambda rate of change remains zero.

At time t2, fuel cut-out mode is request is withdrawn as indicated by the fuel cut-off state level changing to a lower level. Fuel cut-out mode may be exited when driver demand increases. The Lambda value starts decreasing shortly after time t2 to reflect that cylinders are being reactivated. The maximum Lambda rate of change is zero and the minimum Lambda rate of change begins increasing shortly after time t2. The magnitude of the minimum Lambda rate of change reaches a peak shortly after time t2.

In this way, an oxygen sensor may be stimulated so that output of the oxygen sensor responds to a step change in engine air-fuel ratio. The step change in engine air-fuel ratio allows a response time or a time constant of the oxygen sensor to be determined.

Referring now to FIG. 9, a flowchart of a method to estimate a response time or time constant of an oxygen sensor generated in response to a step transition from a richer air-fuel ratio to a leaner air-fuel ratio is shown. Method 900 may be carried out by a control system of a vehicle, such as controller 12 and/or dedicated controller 140, to monitor a sensor such as exhaust gas sensor 126. The method of FIG. 9 in cooperation with the system of FIG. 1 may generate a portion of the sequence that is shown in FIG. 8. Method 900 may be entered when a vehicle that includes an engine is traveling on a road and the engine is rotating and combusting fuel.

At 902, method 900 judges whether or not fuel cut-off mode is requested. Method 900 may judge that fuel cut-off mode is requested when driver demand torque or power is less than a threshold and when vehicle speed is greater than a threshold speed. If method 900 judges that fuel cut-off mode is requested, the answer is yes and method 900 proceeds to 904. Otherwise, the answer is no and method 900 returns to 902.

At 904, method 900 determines an initial Lambda value (e.g., an equivalence ratio value, where Lambda=AF/AF_s, where AF is the engine air-fuel ratio and AF_s is the stoichiometric air-fuel ratio) based on output of an oxygen sensor just before the engine enters fuel cut-off mode. The initial Lambda is stored in controller memory. Method 900 enters fuel cut-off mode after the initial Lambda value is stored to controller memory. Method 900 enters fuel cut-off mode by ceasing fuel flow to the engine as the engine rotates. Fuel is injected to the engine according to a firing order of the engine and timing of each engine cylinders. For example, for a four cylinder engine with a firing order of 1-3-4-2, fuel may be injected for a cycle of the engine (e.g., two engine revolutions) to the cylinders at the following timings: for cylinder number one—during an intake stroke of cylinder number one; for cylinder number two—during an intake stroke of cylinder number two; for cylinder number three—during an intake stroke of cylinder number three; and for cylinder number four—during an intake stroke of cylinder number four. Thus, the fuel is injected to the engine cylinders sequentially according to the engine firing order.

Method 900 may enter fuel cut-off mode in response to the request to enter fuel cut-off mode by sequentially suspending fuel injection (e.g., temporarily deactivating fuel injectors) to engine cylinders according to timing of the request to enter fuel cut-off mode and the cylinder for which fuel injection may be ceased earliest or soonest after the fuel cut-off request. For example, for a four cylinder engine with a firing order of 1-3-4-2, where cylinder number four is the first cylinder for which fuel injection may be ceased following the request to enter fuel cut-off mode, injection may be ceased to cylinder number four, followed by ceasing to flow fuel to cylinder number two, followed by ceasing fuel injection to cylinder number one, followed by ceasing fuel injection to cylinder number three. Method 900 proceeds to 906.

At 906, method 900 judges if the fuel injector of the first cylinder that is to be deactivated after the fuel cut-off request has stopped injecting fuel and has caused the first cylinder to be deactivated. If so, the answer is yes and method 900 proceeds to 908. Otherwise, the answer is no and method 900 returns to 902.

At 908, method 900 determines a rate of change in a Lambda value that is generated from output of an oxygen sensor. In one example, method 900 may determine the rate of change of Lambda via the following equation:

$$Lam_{dot} = \frac{Lam - Lam_{previous}}{\Delta t}$$

where $Lam_{dot}$ is the Lambda rate of change or the rate of change of Lambda, Lam is a current or present Lambda value as determined from output of an oxygen sensor, $Lam_{previous}$ is a lambda value directly prior to Lam, and $\Delta t$ is the amount of time between the time that the Lam value is determined and the time that the $Lam_{previous}$ value was determined. Method 900 proceeds to 910. At 910, method 900 stores a maximum value of $Lam_{dot}$ while the engine is in the fuel cut-off mode. The maximum value may be updated each time a new value of $Lam_{dot}$ exceeds a maximum value of $Lam_{dot}$ denoted at $Peak_{Lamdot}$. For example, if a present value of $Lam_{dot}$ is 1 and the value of the maximum value of $Lam_{dot}$ ($Peak_{Lamdot}$) is 0.8, then the maximum value of $Lam_{dot}$ is revised to 1. However, if a present value of $Lam_{dot}$ is 0.8 and the value of the maximum value of $Lam_{dot}$ ($Peak_{Lamdot}$) is 1, then the maximum value of $Lam_{dot}$ remains 1. Method 900 proceeds to 912.

At 912, method 900 judges if the value of Lambda value is greater than a threshold value. If so, the answer is yes and method 900 proceeds to 914. Otherwise, the answer is no and method 900 returns to 910.

At 914, method 900 determines a time constant of the oxygen sensor from the value of the maximum Lambda rate of change ($Peak_{Lamdot}$). It should be understood that the following description below applies to both lean to rich and rich to lean Lambda transitions even though this particular method is directed to richer to leaner Lambda transitions.

To determine the time constant of the oxygen sensor, method 900 models engine and nominal oxygen sensor operation as a first order linear time invariant (LTI) system with nominal parameters $\tau_c$ (e.g., a nominal time constant, also sometimes known as Smith-Predictor Time Constant or $\tau_{SP}$) and $T_d$ (e.g., a nominal time delay), which may be expressed as:

$$e^{-T_d s} \cdot \frac{1}{\tau_c s + 1}$$

where e is a constant, s is a complex variable, $T_d$ is the nominal time delay, and $\tau_c$ is the nominal time constant. A generic degraded oxygen sensor may also be modelled as a first order LTI system. Therefore, another time constant ($\tau_{deg}$) or delay ($T_{df}$) is added to the nominal plant to produce a second order system. A second order LTI system may be approximated to a first order LTI system using the half-rule approximation:

$$G(s) = \frac{1}{\tau_c s + 1} e^{-T_d s} \frac{1}{\tau_{deg} s + 1} e^{-T_{df} s} \approx$$

$$\frac{1}{[\max(\tau_c, \tau_{deg}) + 0.5 * \min(\tau_c, \tau_{deg})]s + 1} e^{-[T_d + T_{df} + 0.5*\min(\tau_c, \tau_{deg})]s}$$

$$\tau_{sys} \approx \max(T_c, \tau_{deg}) + 0.5 * \min(T_c, \tau_{deg})$$

where G(s) is the transfer function of the engine and degraded oxygen sensor, max is a function that returns a maximum of a first argument (nominal time constant—$\tau_c$) and a second argument (time constant of degraded oxygen sensor—$\tau_{deg}$), e is a constant (Euler's number), s is a complex variable, min is a function that returns a minimum of a first argument ($\tau_c$) and a second argument ($\tau_{deg}$), $T_{df}$ is an additional delay of the degraded oxygen sensor, $T_d$ is nominal delay of the oxygen sensor, and $\tau_{sys}$ is the approximated time constant of the system including the engine and the degraded oxygen sensor. By applying the half-rule, the system model is simplified and it may be simpler to determine the magnitude of the degradation that is in the plant. The inventors have determined that $\tau_{sys}$ has an exponential correlation with the peak (maximum for rich to lean and minimum for lean to rich) rate of change of the UEGO sensor during a fuel cut-off transition, either entering fuel cut-off or exiting fuel cut-off. This implies that the slower the rate of change, the higher $\tau_{sys}$ the system has. The correlation can be expressed by the following equation:

$$t_{sys} = \frac{-\Delta t}{\ln\left(1 - \frac{Lam_{cur} - Lam_0}{Lam_{Step}}\right) - \ln\left(1 - \frac{Lam_{prev} - Lam_0}{Lam_{Step}}\right)}$$

$$Lam_{Step} = CalValue - Lam_0$$

where $t_{sys}$ is the combined system time constant, $\Delta t$ is the background rate, $Lam_{cur}$ is the lambda measurement at the time of the maximum or minimum lam_dot, $Lam_0$ is the lambda value before the initial lambda is measured, $Lam_{prev}$ is the lambda measurement one sample before the time of the maximum or minimum lam_dot, and CalValue is a calibrated value specific to each engine bank and to entry or exit of the fuel cut-off. The CalValue may be determined in a process that involves mapping mass air flow for each cylinder bank during fuel cut-off entry and exit at different engine speeds and loads. This may allow a linear convex optimization equation to determine The CalValue may be affected by an amount of purge flow during a DFSO event and an airflow flowing through the engine. Additionally or alternatively, the CalValue may be a function of air mass or a percentage of fuel in the purge flow.

In one example, the CalValues represent the step change end point. The time constant estimate may be for DFSO entry, so a theoretical step change end point is the final UEGO sensor output during fuel shut off, such as when lambda is equal to 2.2 (maximum lean value). In some examples, additionally or alternatively, the CalValue may be optimized for enhanced results, such that the value used for CalValue provides an accurate estimate of a time constant for all fault levels.

By measuring the oxygen sensor rate of change ($Lam_{dot}$), the system time constant $\tau_{sys}$ may be approximated passively so as not to disturb engine operation. The inventors have also realized that the time constant of a degraded oxygen sensor $\tau_{deg}$ may be extracted from $\tau_{sys}$ if $\tau_C$ ($\tau_{SP}$) is known, by applying what may be referred to as a reverse half-rule approximation, which is given by:

$$\tau_{deg} = \begin{cases} \text{if } \max(\tau_{sys}, \tau_{SP}) - \min(\tau_{sys}, \tau_{SP}) < Cal_{Value}, & \max(\tau_{Sys}, \tau_{SP}) - \min(\tau_{sys}, \tau_{SP}) \\ \text{else}, & \max(\tau_{Sys}, \tau_{SP}) - 1/2 * \min(\tau_{sys}, \tau_{SP}) \end{cases}$$

Thus, $\tau_{deg}$=max ($\tau_{sys}$, $\tau_{SP}$)−min($\tau_{sys}$, $\tau_{SP}$) or $\tau_{deg}$=max ($\tau_{sys}$, $\tau_{SP}$)−0.5*min($\tau_{sys}$, $\tau_{SP}$). By applying this methodology, a slow response degradation of the oxygen sensor, the rich to lean degradation may be approximated during a fuel cut-off entry, while the lean to rich degradation may be approximated during a fuel cut-off exit, if degradation is observed during fuel cut-off entry and exit, then symmetrical slow response degradation is present. By determining degradation of an exhaust gas sensor using the present non-intrusive approach with data collected during selected operating conditions (e.g., during fuel cut-off mode), exhaust gas sensor degradation monitoring may be performed without performing complex statistical analysis. In addition, based on the determination of a degraded oxygen sensor, appropriate actions may be taken by the fueling algorithm to compensate for the degraded oxygen sensor.

The system time constant $\tau_{sys}$ may be determined by monitoring and comparing current and previous air/fuel ratios to the starting and final expected air/fuel ratios. The final expected air/fuel ratio may be based on fuel cut-off entry or exit occurring, and further based on the starting air/fuel ratio and anticipated engine operation following fuel cut-off. Data showing the exponential correlation between $\tau_{sys}$ and maximum or minimum rate of Lambda change is shown in FIG. 11.

Once the data is obtained, the nominal time constant is determined via a table look up as shown in FIG. 12. The table may be a reference to describe how the system is expected to behave nominally at any engine operation point (e.g., speed/load). Alternatively, a polynomial function that is a function of engine speed and load may be generated that outputs the nominal time constant $\tau_{SP}$.

The nominal time constant $\tau_{SP}$ and the data that is representative of a degraded oxygen sensor may be applied to determine a theoretical time constant $\tau_{theory}$. The theoretical time constant $\tau_{theory}$ may be determined via applying the half-rule approximation to the degraded oxygen sensor fuel cut-off events since the magnitude of $\tau_{deg}$ is known because the degraded oxygen sensor response was purposefully induced for mapping. The theoretical time constant may be determined via the following equation:

$$\tau_{theory} = \max(\tau_{SP}, \tau_{deg}) + 0.5 * \min(\tau_{SP}, T_{fault})$$

Applying this methodology, degradation magnitudes may be accurately approximated for every single fuel cut-off entry and exit event so that a nominal oxygen sensor may be distinguished from a degraded oxygen sensor. The magnitude of degradation of the oxygen sensor may be determined by averaging degradation magnitudes for an actual total number of events for both the fuel cut-off entry and exit conditions.

Once the oxygen sensor degradation magnitude has been determined for both directions of entry into fuel cut-off, it may be determined whether or not the oxygen sensor has any slow response degradation faults. Calibration (e.g., adjustable) thresholds may be determined to establish when the oxygen sensor degradation is sufficient to increase tailpipe emissions beyond the regulatory standards. A degradation determination for an oxygen sensor may be made in this order: First, if the degradation magnitude exceeds thresholds set for both rich to lean and lean to rich, then a symmetric slow response degradation may be indicated; Second, if the degradation magnitude only exceeds a threshold set for rich to lean, but not lean to rich, then an asymmetric rich to lean slow response degradation may be indicated; Third if the fault magnitude only exceeds the threshold set for lean to rich, but not rich to lean, then an asymmetric lean to rich slow response degradation may be indicated. The indications may be provided via a human/machine interface. Method 900 proceeds to 916.

At 916, method 900 determines whether or not compensation for oxygen sensor degradation is enabled, and if enabled, compensates for the oxygen sensor degradation. Compensation for oxygen sensor degradation may be enabled based on a method that applies separate unique adjustable thresholds and with additional checks for asymmetric faults. Note that all six degradation patterns may have independent adjustable compensation thresholds. The degradation compensation may be activated only for those degradation conditions for which it may be desired such as: if the degradation magnitude exceeds adjustable thresholds set for both rich-to-lean and lean-to-rich magnitudes, then symmetric slow response compensation is enabled; if the degradation magnitude exceeds an adjustable threshold set for rich-to-lean and the lean-to-rich magnitude is less than a second adjustable threshold, then asymmetric rich-to-lean compensation is enabled; if the degradation magnitude exceeds the threshold set for lean-to-rich and the rich-to-lean magnitude is less than an adjustable threshold, then asymmetric lean-to-rich compensation is enabled. The above method is used for both filter and delay types of degradation.

Thus, for richer to leaner Lambda transitions, a time constant for an oxygen sensor may be determined based on a relationship between a maximum rate of change of Lambda and an oxygen sensor time constant. Further, the oxygen sensor time constant may be estimated from mapped oxygen sensor response data.

Turning now to FIG. 10, a flowchart of a method to estimate a response time or time constant of an oxygen sensor generated in response to a step transition from a leaner air-fuel ratio to a richer air-fuel ratio is shown. Method 1000 may be carried out by a control system of a vehicle, such as controller 12 and/or dedicated controller 140, to monitor a sensor such as exhaust gas sensor 126. The method of FIG. 10 in cooperation with the system of FIG. 1 may generate a portion of the sequence that is shown in FIG. 8. Method 1000 may be entered when a vehicle that includes an engine is traveling on a road and the engine is rotating and in a fuel cut-off mode where fuel is not being delivered to the engine.

At 1002, method 1000 judges whether or not an exit from fuel cut-off mode is requested. Method 1000 may judge that an exit from fuel cut-off mode is requested when driver demand torque or power is increasing. If method 1000 judges that an exit from fuel cut-off mode is requested, the answer is yes and method 1000 proceeds to 1004. Otherwise, the answer is no and method 1000 returns to 1002.

At 1004, method 900 determines an initial Lambda value based on output of an oxygen sensor just before the engine enters fuel cut-off mode. The initial Lambda is stored in controller memory. Method 1000 exits fuel cut-off mode after the initial Lambda value is stored to controller memory. Method 1000 exits fuel cut-off mode by flowing fuel to the engine as the engine rotates. Fuel is injected to the engine according to a firing order of the engine and timing of each engine cylinders following exit from fuel cut-off mode.

Method 1000 may exit fuel cut-off mode in response to the request to exit fuel cut-off mode by sequentially starting fuel injection to engine cylinders according to timing of the request to exit fuel cut-off mode and the cylinder for which fuel injection may be ceased earliest or soonest after the exit fuel cut-off request. For example, for a four cylinder engine with a firing order of 1-3-4-2, where cylinder number four is the first cylinder to be reactivated following the request to exit fuel cut-off mode, injection may begin to cylinder number four, followed by beginning fuel flow to cylinder number two, followed by beginning fuel flow to cylinder number one, followed by beginning fuel flow to cylinder number three. Method 1000 proceeds to 1006.

At 1006, method 1000 judges if the fuel injector of the first cylinder that is to be activated after the exit fuel cut-off request has started injecting fuel and has caused the first cylinder to be activated. If so, the answer is yes and method 1000 proceeds to 1008. Otherwise, the answer is no and method 1000 returns to 1002.

At 1008, method 1000 determines a rate of change in a Lambda value that is generated from output of an oxygen sensor. Method 1000 proceeds to 1010.

At 1010, method 1000 stores a minimum value of $Lam_{dot}$ while the engine has exited the fuel cut-off mode. The minimum value may be updated each time a new value of $Lam_{dot}$ exceeds a minimum value of $Lam_{dot}$ denoted at $Peak_{Lamdot}$. For example, if a present value of $Lam_{dot}$ is −0.8 and the value of the maximum value of $Lam_{dot}$ ($Peak_{Lamdot}$) is −1, then the minimum value of $Lam_{dot}$ is revised to −1. However, if a present value of $Lam_{dot}$ is −0.8 and the value of the minimum value of $Lam_{dot}$ ($Peak_{Lamdot}$) is −1, then the minimum value of $Lam_{dot}$ remains −1. Method 1000 proceeds to 1012.

At 1012, method 1000 judges if the present value of Lambda value is between a threshold minimum Lambda value and a threshold maximum Lambda value. If so, the answer is yes and method 1000 proceeds to 1014. Otherwise, the answer is no and method 1000 returns to 1010.

At 1014, method 1000 determines an oxygen sensor time constant as previously described at step 914 of FIG. 9. Method 1000 proceeds to 1016.

At 1016, method 1000 determines whether or not compensation for oxygen sensor degradation is enabled, and if enabled, compensates for the oxygen sensor degradation. Compensation for oxygen sensor degradation may be enabled based on a method that applies separate unique adjustable thresholds and with additional checks for asymmetric faults. Note that all six degradation patterns may have independent adjustable compensation thresholds. The degradation compensation may be activated only for those degradation conditions for which it may be desired such as: if the degradation magnitude exceeds adjustable thresholds set for both rich-to-lean and lean-to-rich magnitudes, then symmetric slow response compensation is enabled; if the degradation magnitude exceeds an adjustable threshold set for rich-to-lean and the lean-to-rich magnitude is less than a second adjustable threshold, then asymmetric rich-to-lean compensation is enabled; if the degradation magnitude exceeds the threshold set for lean-to-rich and the rich-to-lean magnitude is less than an adjustable threshold, then asymmetric lean-to-rich compensation is enabled. The above method is used for both filter and delay types of degradation.

Thus, for leaner to richer Lambda transitions, a time constant for an oxygen sensor may be determined based on a relationship between a maximum rate of change of Lambda and an oxygen sensor time constant. Further, the oxygen sensor time constant may be estimated from mapped oxygen sensor response data.

Thus, the methods of FIGS. 9 and 10 provide for a method of monitoring an exhaust gas sensor in an engine exhaust passage, comprising: generating an indication of exhaust gas sensor degradation via a controller according to a time constant of the exhaust gas sensor exceeding a threshold, the time constant of the exhaust gas sensor estimated based on a rate of change of an output of the exhaust gas sensor during a time period. In a first example, the method includes where the time constant is an amount of time that it takes for the output of the exhaust gas sensor to reach a predetermined percentage of a final output of the exhaust gas sensor responding to a step change of exhaust gas constituents. In a second example that may include the first example, the method includes wherein the step change of exhaust gas constituents is generated via performing a step change in an engine air-fuel ratio. In a third example that may include one or both of the first and second examples, the method includes wherein generating the indication of exhaust gas sensor degradation includes displaying a message via a human/machine interface. In a fourth example that may include one or more of the first through third examples, the method further comprises adjusting engine fuel control in response to the indication of exhaust gas sensor degradation. In a fifth example that may include one or more of the first through fourth examples, the method further comprises transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is leaner than the second air-fuel ratio mixture. In a sixth example that may include one or more of the first through fifth examples, the method further comprises transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is richer than the second air-fuel ratio mixture.

The methods of FIGS. 9 and 10 also provide for a method of monitoring an exhaust gas sensor in an engine exhaust passage, comprising generating an indication of exhaust gas sensor degradation via a controller according to a time constant of the exhaust gas sensor exceeding a threshold, the time constant of the exhaust gas sensor estimated based on a rate of change of an output of the exhaust gas sensor during a time period; and adjusting parameters of a fuel controller according to the time constant of the exhaust gas sensor. In a first example, the method further comprises adjusting fuel injection in response to the adjusted parameters. In a second example that may include the first example, the method includes wherein the adjusted parameters include an integral gain. In a third example that may include one or both of the first and second examples, the method includes wherein the adjusted parameters include a proportional gain. In a fourth example that may include one or more of the first through third examples, the method includes wherein the adjusting the parameters include replacing a controller time constant with the time constant of the exhaust gas sensor.

Referring now to FIG. 11, a plot 1100 that shows an output of the equation for the system time constant ($t_{sys}$) provided above for determining a system time constant is shown. The x-axis represents time (in seconds) and the y-axis represents lambda. The plot 1102 represents an unfaulted system with a lambda response rate equal to a determined rate. Plot 1104 represents a first faulted system and plot 1106 represents a second faulted system. The second faulted system is more faulted than the first system and a lambda response rate of the second system is slower than each of the first faulted system and the unfaulted system. The time constant equation may be used in combination with the data between lines 1112 and 1114 to calculate the system time constant.

Referring now to FIG. 12, a plot of an example table that relates a nominal system time constant to engine speed and load is shown. The vertical axis represents nominal time constant values and the two horizontal axes represent engine speed and engine load respectively. It may be observed that larger nominal time constants occur at lower engine speeds due to longer through put times for exhaust gases at lower engine speed.

Referring now to FIG. 13, histograms showing separation between degraded oxygen sensor data and nominal oxygen sensor data is shown. The cross hatched bars 1302 represent data for nominal oxygen sensor data and the empty bars 1304 represent data for degraded oxygen sensor data. The data shown is based on a richer to leaner Lambda transition.

The disclosure provides support for a method of monitoring an exhaust gas sensor in an engine exhaust passage, comprising generating an indication of exhaust gas sensor degradation via a controller according to a time constant of the exhaust gas sensor exceeding a threshold, the time constant of the exhaust gas sensor estimated based on a comparison of air/fuel ratios of the exhaust gas sensor. A first example of the method further includes where the time constant is an amount of time that it takes for the output of the exhaust gas sensor to reach a predetermined percentage of a final output of the exhaust gas sensor responding to a step change of exhaust gas constituents. A second example of the method, optionally including the first example, further includes where the step change of exhaust gas constituents is generated via performing a step change in an engine air-fuel ratio. A third example of the method, optionally including one or more of the previous examples, further includes where generating the indication of exhaust gas sensor degradation includes displaying a message via a human/machine interface. A fourth example of the method, optionally including one or more of the previous examples, further includes where adjusting engine fuel control in response to the indication of exhaust gas sensor degradation. A fifth example of the method, optionally including one or more of the previous examples, further includes where transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is leaner than the second air-fuel ratio mixture. A sixth example of the method, optionally including one or more of the previous examples, further includes transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is richer than the second air-fuel ratio mixture.

The disclosure provides additional support for a system for a vehicle including an engine including a fuel injection system, an exhaust gas sensor coupled in an exhaust system of the engine, and a controller including instructions executable to estimate an oxygen sensor time constant via monitoring a current air/fuel ratio and a previous air/fuel ratio, comparing the current and previous air/fuel ratios to a starting air/fuel ratio and an expected final air/fuel ratio, and indicate a presence or an absence of degradation of the exhaust gas sensor in response to the oxygen sensor time constant. A first example of the system further includes where the previous air/fuel ratio is directly before the current air/fuel ratio. A second example of the system, optionally including the first example, further includes where the oxygen sensor time constant is estimated via a reverse half rule approximation. A third example of the system, optionally including one or more of the previous examples, further includes where the time constant is further based on a calibrated value specific to one or more of a cylinder bank, a fuel cut-off entry, and a fuel cut-off exit. A fourth example of the system, optionally including one or more of the previous examples, further includes where additional instructions to adjust engine fuel delivery based on the oxygen sensor time constant. A fifth example of the system, optionally including one or more of the previous examples, further includes additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is leaner than the second air-fuel ratio mixture, and wherein the transition includes exiting a fuel cut-off event. A sixth example of the system, optionally including one or more of the previous examples, further includes additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is richer than the second air-fuel ratio mixture, and wherein the transition includes entering a fuel cut-off event. A seventh example of the system, optionally including one or more of the previous examples, further includes where the presence or absence is indicated via a human/machine interface.

The disclosure provides additional support for a method of monitoring an exhaust gas sensor in an engine exhaust passage including generating an indication of exhaust gas sensor degradation via a controller according to a time constant of the exhaust gas sensor exceeding a threshold, the time constant of the exhaust gas sensor estimated based on based on a comparison of air/fuel ratios of the exhaust gas sensor during a fuel cut-off entry or a fuel cut-off exit, and adjusting parameters of a fuel controller according to the time constant of the exhaust gas sensor. A first example of the method further includes where the air/fuel ratios included in the comparison comprise a current air/fuel ratio and a previous air/fuel ratio compared to a starting air/fuel ratio and an expected final air/fuel ratio. A second example of the method, optionally including the first example, further includes where the previous air/fuel ratio is directly before the current air/fuel ratio. A third example of the method, optionally including one or more of the previous examples, further includes where the monitoring occurs during a fuel cut-off event in response to inputs provided by a vehicle operator via an accelerator pedal and/or a brake pedal. A fourth example of the method, optionally including one or more of the previous examples, further includes where the time constant is further based on a calibrated value, the calibrated value calibrated to one or more of a cylinder bank, entry conditions to the fuel cut-off event, and exit conditions to the fuel cut-off event.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor in an engine exhaust passage, comprising:
generating an indication of exhaust gas sensor degradation via a controller according to a time constant of the exhaust gas sensor exceeding a threshold during a fuel cut-off entry and exit, the time constant of the exhaust gas sensor estimated based on a comparison of air/fuel ratios of the exhaust gas sensor; and
adjusting engine fuel delivery based on the time constant.

2. The method of claim 1, where the time constant is an amount of time that it takes for the output of the exhaust gas sensor to reach a predetermined percentage of a final output of the exhaust gas sensor responding to a step change of exhaust gas constituents.

3. The method of claim 2, wherein the step change of exhaust gas constituents is generated via performing a step change in an engine air-fuel ratio.

4. The method of claim 1, wherein generating the indication of exhaust gas sensor degradation includes displaying a message via a human/machine interface.

5. The method of claim 1, further comprising adjusting engine fuel control in response to the indication of exhaust gas sensor degradation.

6. The method of claim 1, further comprising transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is leaner than the second air-fuel ratio mixture.

7. The method of claim 1, further comprising transitioning from combusting a first air-fuel ratio mixture in an engine to which the engine exhaust passage is coupled to combusting a second air-fuel ratio mixture in the engine to stimulate the output of the exhaust gas sensor during the time period, where the first air-fuel ratio mixture is richer than the second air-fuel ratio mixture.

8. A system for a vehicle, comprising:
an engine including a fuel injection system;
an exhaust gas sensor coupled in an exhaust system of the engine; and
a controller including instructions executable to:
estimate an oxygen sensor time constant via monitoring a current air/fuel ratio and a previous air/fuel ratio during a fuel cut-off entry and exit;
comparing the current and previous air/fuel ratios to a starting air/fuel ratio and an expected final air/fuel ratio;
indicate a presence or an absence of degradation of the exhaust gas sensor in response to the oxygen sensor time constant; and adjust engine fuel delivery based on the oxygen sensor time constant.

9. The system of claim 8, wherein the previous air/fuel ratio is directly before the current air/fuel ratio.

10. The system of claim 9, wherein the oxygen sensor time constant is estimated via a reverse half rule approximation.

11. The system of claim 8, wherein the time constant is further based on a calibrated value specific to a cylinder bank, the fuel cut-off entry, and the fuel cut-off exit.

12. The system of claim 8, further comprising additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is leaner than the second air-fuel ratio mixture, and wherein the transition includes exiting a fuel cut-off event.

13. The system of claim 8, further comprising additional instructions to transition from combusting a first air-fuel ratio mixture in the engine to combusting a second air-fuel ratio mixture in the engine to stimulate an output of the exhaust gas sensor during a time period in which the rate of change of the signal is determined, where the first air-fuel ratio mixture is richer than the second air-fuel ratio mixture, and wherein the transition includes entering a fuel cut-off event.

14. The system of claim 8, wherein the presence or absence is indicated via a human/machine interface.

15. A method of monitoring an exhaust gas sensor in an engine exhaust passage, comprising:
   generating an indication of exhaust gas sensor degradation via a controller according to a time constant of the exhaust gas sensor exceeding a threshold, the time constant of the exhaust gas sensor estimated based on based on a comparison of air/fuel ratios of the exhaust gas sensor during a fuel cut-off entry and a fuel cut-off exit; and
   adjusting parameters of a fuel controller according to the time constant of the exhaust gas sensor to adjust engine fuel delivery based on the time constant.

16. The method of claim 15, wherein the air/fuel ratios included in the comparison comprise a current air/fuel ratio and a previous air/fuel ratio compared to a starting air/fuel ratio and an expected final air/fuel ratio.

17. The method of claim 16, wherein the previous air/fuel ratio is directly before the current air/fuel ratio.

18. The method of claim 15, wherein the monitoring occurs during a fuel cut-off event in response to inputs provided by a vehicle operator via an accelerator pedal and/or a brake pedal.

19. The method of claim 18, wherein the time constant is further based on a calibrated value, the calibrated value calibrated to one or more of a cylinder bank, entry conditions to the fuel cut-off event, and exit conditions to the fuel cut-off event.

* * * * *